United States Patent

[11] 3,629,994

| [72] | Inventor | Royal R. Jones<br>Birmingham, Ala. |
|---|---|---|
| [21] | Appl. No. | 23,710 |
| [22] | Filed | Mar. 30, 1970 |
| [45] | Patented | Dec. 28, 1971 |
| [73] | Assignee | The Cincinnati Butchers' Supply Company<br>Cincinnati, Ohio |

[54] CONDENSING UNIT AND METHOD OF USE
15 Claims, 1 Drawing Fig.

[52] U.S. Cl. .................................................. 55/20,
55/85, 55/93, 55/95, 55/222, 55/227, 55/269,
55/466, 210/69, 210/71, 210/73, 210/149,
210/181
[51] Int. Cl. ...................................................... B01d 50/00
[50] Field of Search............................................ 210/69, 71,
73, 113, 114, 115, 118, 149, 181; 55/20, 80, 82,
85, 93–99, 222, 227, 256, 268, 289, 466;
260/412.6, 412.7

[56] References Cited
UNITED STATES PATENTS

| 1,367,652 | 2/1921 | Bannon et al. ................ | 210/71 |
| 2,086,072 | 7/1937 | Fauth et al. .................... | 210/69 X |
| 3,164,445 | 1/1965 | Hampel ........................ | 55/466 UX |
| 3,183,645 | 5/1965 | Teller ............................ | 55/20 |
| 3,338,029 | 8/1967 | Warfield, Jr. .................. | 55/20 |

*Primary Examiner*—John Adee
*Attorney*—J. Warren Kinney, Jr.

ABSTRACT: The condensing unit efficiently and effectively treats meat packing plant waste to obviate production of objectionably odorous gases, liquids, and solids which could otherwise pollute surrounding air and nearby watercourses; the treatment being characterized by a two-step condensing operation in which the second stage operates only in the event of overburdening of the first stage of operation.

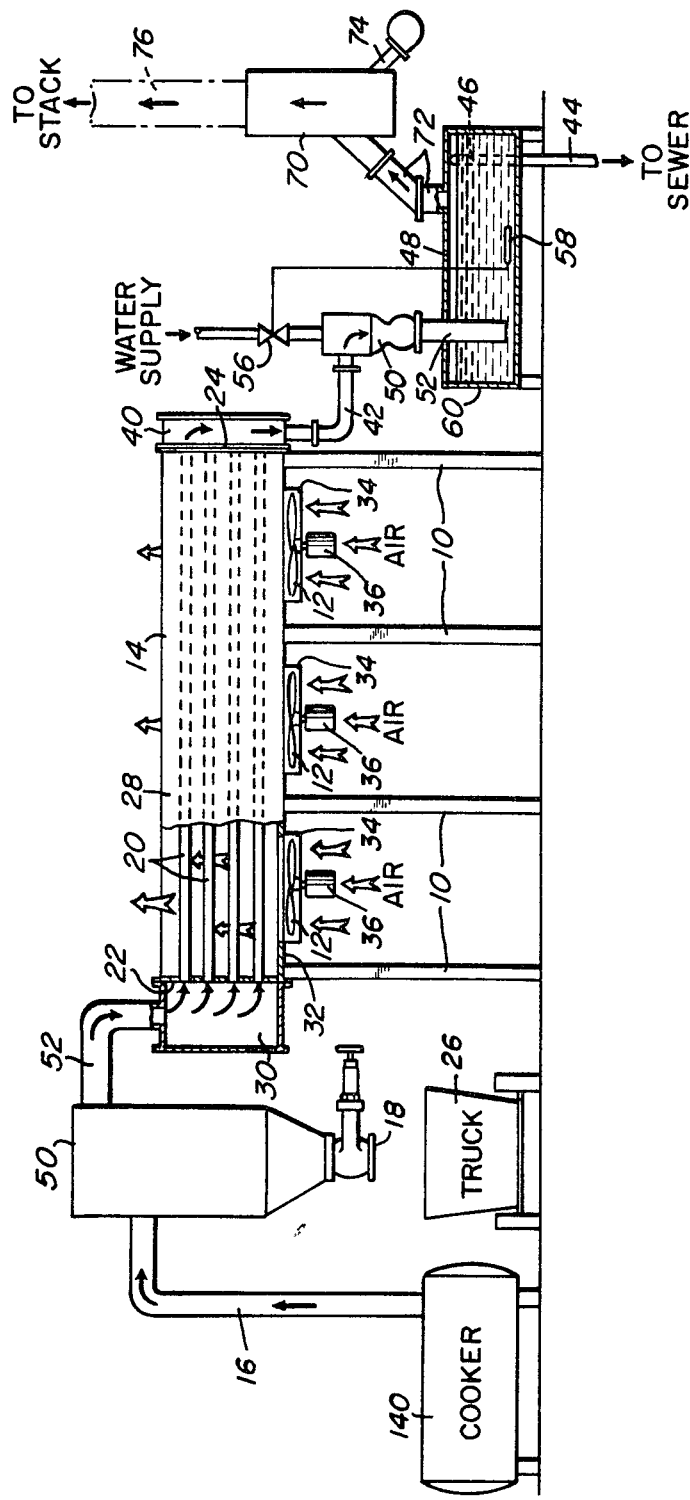

CONDENSING UNIT AND METHOD OF USE

This invention relates to a condensing unit and method of use adapted especially for use in the disposal of meat packing house waste, such as animal fats, hooves, horns, bones, offal and the like, which generally are subjected to cooking.

When the animal wastes from packing plants are cooked, and the vapors condensed, objectionable odorous gases and liquids are produced which heretofore were impossible to dispose of without polluting the surrounding air and nearby watercourses.

An object of the present invention is to provide a simple yet effective condensing unit for cooker vapors, which operates to deliver gaseous and liquid wastes free from objectionable odors and pollutants.

Another object of the invention is to provide a condensing unit of the character stated, which operates with a minimum input of power and labor, thereby reducing packing plant overhead expense.

A further object is to provide a unit for the purposes stated, which operates with a minimum of maintenance labor and expense over long periods of time, and is so constructed as to eliminate frequent periodic cleaning and other servicing attention.

The foregoing and other objects are attained by the means described herein and illustrated upon the accompanying drawing, in which:

The drawing FIGURE is an elevational view, with certain parts cross-sectioned and others shown conventionally, disclosing the condensing unit embodying the present invention.

In the drawing, a conventional cooker 14 delivers through pipe 16, the vapors and accompanying light solids resulting from cooking animal wastes therein. Pipe 16 delivers the vapors and solids in suspension, to a solids catchall trap device 50, which device includes a bottom discharge port controlled by a gate valve 18. This valve is usually to be opened following a cooking period, to dump the solids accumulated by trap 50 onto a conveyor or into a truck or equivalent conveyance 26 for disposal, or for reintroduction into the cooker.

Vapors from the trap device 50 pass over by way of pipe 52, into the intake manifold 30 of a main condenser 14, whence the vapors are distributed to a multiplicity of tubes 20 having their opposite open ends secured to bulkheads 22 and 24. The battery of tubes is surrounded by a condenser housing 28 open at its top for freely releasing ascending air to atmosphere, as indicated by the upwardly pointed arrows. The condenser housing may be supported upon a series of posts 10.

At intervals along the length of air condenser 14, its bottom wall 32 may be provided with circular openings or air intake ports 34. Each of said ports incorporates a fan or equivalent air mover 12, these being driven by electric motors 36. Of course, the several air movers or fans 12 could be driven by a single motor or otherwise, if desired.

The several air movers 12 induce a high volume movement of cooling air upwardly about the condenser tubes 20, resulting in a continuous extraction of water from the vapor fed into the tubes 20.

Condensate and residual vapor flows from the tubes 20 into a collecting manifold or chamber 40 at the discharge end of main condenser 14. From the collecting manifold or chamber 40, a pipe 42 directs the condensate and residual vapors into a condensate holding take 60. The holding tank has connection with a sewer or other dump for liquid, through an overflow pipe 44 which has its open upper end 46 spaced from the lid or cover 48 of the holding tank, thereby assuring the presence of an air space and a head of condensate in the tank.

Any residual vapors or gases carried over into the holding tank 60 will rise to the surface of liquid therein, and will be conducted by pipe 72 into an afterburner 70. The intense heat of the afterburner reduces to harmless and clean exhaust, any material fed thereto from the holding tank. The afterburner may be fired by a high intensity burner 74 and may discharge into a suitable exhaust outlet of stack 76.

In a preferred most effective construction, there is interposed between the collecting manifold 40 and the holding tank 60, a supplementary water cooled condenser 50 whose discharge pipe 52 empties into the holding tank. Although condensate from manifold 40 will pass continuously through condenser 50 and into the holding tank, said condenser 50 is to perform a noticeable condensing function only under extreme conditions, as when air condenser 14 is overburdened.

The overburdening of main condenser 14 may be determined by the temperature of condensate accumulating at a suitable sensing station or in holding tank 60. Accordingly, a thermocouple 58 or other heat-responsive controller may be located within or ahead of the holding tank to sense any temperature changes occurring therein, and when the temperature sensed rises to a predetermined high limit, approximately 120° for example, said heat-responsive controller acts to initiate the opening of a cold water valve 56 in control of water supply pipe 54. The opening of valve 56 of course conditions the condenser 50 for performance of its condensing function, which will continue as long as the controller 58 so demands. When the temperature of condensate so sensed declines below the high limit, or below a predetermined value, the controller 58 will initiate closing of valve 56, thereby to deactivate condenser 50 until such time as another temperature rise occurs in the holding tank or at the sensing station selected.

The condensing unit operating in the manner herein disclosed makes possible the disposition of animal waste without dissemination of objectionably odorous gases, solids, or liquids, and without polluting the air or watercourses into which the unit discharges its end products. The solids collected by trap 50 may be recooked or otherwise treated to produce useful products of commercial value.

I claim:

1. A condensing unit for the treatment of meat packing plant animal waste, to avoid air and watercourse pollution, said unit comprising in combination: an air-cooled main condenser receptive of waste gases and vapors from a cooker, said condenser including cooling means and a condensate collecting chamber; a supplementary water-cooled condenser including a valve operative for controlling delivery of cooling water to said supplementary condenser, said supplementary condenser having a condensate discharge port; means for transferring condensate from the collecting chamber of the main condenser to said supplementary condenser; a holding tank and means directing thereinto the condensate from said discharge port of the supplementary condenser; an overflow pipe associated with the holding tank and arranged to relieve the holding tank of condensate while maintaining a head of condensate and an overlying air space in said holding tank; an afterburner including an exhaust outlet, and conduit means for conveying to the afterburner such vapors or gases as may accumulate in the overlying air space of the holding tank; and control means operative to initiate opening of the water control valve whenever the temperature of condensate directed to the holding tank reaches a maximum predetermined value, and to initiate closing of said valve when said temperature declines to a predetermined lower value.

2. The combination as defined by claim 1, wherein the means last mentioned includes a heat-responsive controller located at a sensing station influenced by the heat of condensate delivered by the main condenser.

3. The combination as defined by claim 1, wherein the means last mentioned includes a heat-responsive controller located within the holding tank.

3. The combination as defined by claim 1, wherein the means last mentioned includes a heat-responsive controller located within the holding tank.

4. The combination as defined by claim 1, wherein said main condenser includes forced air cooling means, and a multiplicity of condensing tubes delivering condensate to said collecting chamber.

5. The unit as defined by claim 1, wherein is included in the combination: a cooker of animal waste; a solids catchall trap device having a discharge valve to be selectively opened or closed; a pipe for conveying vapors and solids in suspension from the cooker to said trap device; and a second pipe delivering vapors and gases substantially free of solids, from the trap device to said main condenser.

6. The unit as defined by claim 5, wherein said control means for water includes a heat-responsive controller influenced by the heat of condensate delivered by the main condenser.

7. The unit as defined by claim 5, wherein said control means for water includes a heat-responsive controller located within the holding tank.

8. The unit as defined by claim 5, wherein said control means for water includes a heat-responsive controller influenced by the temperature of condensate contained within the holding tank.

9. The unit as defined by claim 1, wherein the means last mentioned includes a heat-responsive controller influenced by the temperature of condensate contained within the holding tank.

10. The method of treating meat packing plant animal waste, which comprises: cooking the waste material to drive off gases, vapors, and lightweight solids; then separating said solids substantially from the gases and vapors, and passing said gases and vapors to a main condenser wherein is produced a condensate; gathering and directing said condensate into a supplementary condenser which is operative only during intervals when the temperature of the condensate exceeds a predetermined high limit; then passing the condensate from the supplementary condenser whether operative or not, to a holding tank wherein is maintained a substantially constant head of condensate and an overlying air space; exhausting from said holding tank air space any accumulated vapors, gases or odors into an oxidizing afterburner which in turn discharges to atmosphere the product resulting from oxidizing in the afterburner such vapors, gases or odors.

11. The method as defined by claim 10, wherein the supplementary condenser is supplied with cooling fluid to induce a condensing action therein so long as the condensate from the main condenser exceeds in temperature a predetermined upper limit, said supply of cooling fluid to the supplementary condenser being terminated incident to a reduction of the condensate temperature to a valve below said upper limit.

12. The method as defined by claim 11, wherein the main condenser is air-cooled.

13. The method as defined by claim 11, wherein the supplementary condenser is water-cooled.

14. The method as defined by claim 12, wherein the supplementary condenser is water-cooled.

15. The method as defined by claim 14, wherein the temperature of condensate accumulated in the holding tank determines the operativeness and the inoperativeness of the supplementary condenser.

* * * * *